(12) United States Patent
Nielsen et al.

(10) Patent No.: US 7,941,233 B2
(45) Date of Patent: May 10, 2011

(54) SYSTEM AND METHOD FOR LIMITATION HANDLING

(75) Inventors: Martin Sandal Nielsen, Nørre Nebel (DK); Bjarne Ravndal Andreasen, Struer (DK)

(73) Assignee: VKR Holding A/S (DK)

( * ) Notice: Subject to any disclaimer, the term of this patent is extended or adjusted under 35 U.S.C. 154(b) by 414 days.

(21) Appl. No.: 11/994,625

(22) PCT Filed: Jul. 4, 2005

(86) PCT No.: PCT/DK2005/000463
§ 371 (c)(1),
(2), (4) Date: Mar. 13, 2008

(87) PCT Pub. No.: WO2007/003186
PCT Pub. Date: Jan. 11, 2007

(65) Prior Publication Data
US 2008/0221717 A1     Sep. 11, 2008

(51) Int. Cl.
*G05B 13/02* (2006.01)
*G05B 11/01* (2006.01)
*G01N 37/00* (2006.01)
*G08B 29/00* (2006.01)
*G08B 1/08* (2006.01)

(52) U.S. Cl. .............. 700/33; 700/19; 700/20; 340/514; 340/516; 340/539.14; 702/82

(58) Field of Classification Search .............. 700/19–20, 700/276–278, 28, 32–33; 340/506, 514, 340/516, 539.14, 539.26; 709/220, 241, 709/244; 702/82
See application file for complete search history.

(56) References Cited

U.S. PATENT DOCUMENTS

| | | | | |
|---|---|---|---|---|
| 4,349,879 A | * | 9/1982 | Peddie et al. | 700/295 |
| 5,039,851 A | * | 8/1991 | Green et al. | 250/207 |
| 5,375,508 A | | 12/1994 | Knepler et al. | |
| 5,444,851 A | * | 8/1995 | Woest | 709/222 |
| 5,841,363 A | * | 11/1998 | Jakob et al. | 340/5.26 |
| 6,115,713 A | * | 9/2000 | Pascucci et al. | 1/1 |
| 6,167,341 A | * | 12/2000 | Gourmelen et al. | 701/95 |
| 6,574,234 B1 | * | 6/2003 | Myer et al. | 370/462 |
| 6,658,475 B1 | * | 12/2003 | Ueno | 709/229 |
| 2004/0070516 A1 | * | 4/2004 | Nielsen | 340/825.72 |
| 2005/0034374 A1 | * | 2/2005 | Ebbe et al. | 49/325 |
| 2005/0143009 A1 | * | 6/2005 | Nielsen et al. | 455/67.11 |
| 2006/0046766 A1 | * | 3/2006 | Hair et al. | 455/522 |
| 2009/0193717 A1 | * | 8/2009 | Ebbe et al. | 49/324 |

FOREIGN PATENT DOCUMENTS
EP       0 432 138       6/1991
(Continued)

OTHER PUBLICATIONS
International Search Report; PCT/DK2005/000463; Jan. 20, 2006.

*Primary Examiner* — Ramesh B Patel
(74) *Attorney, Agent, or Firm* — Cantor Colburn LLP

(57) ABSTRACT

System and method for controlling at least one device such as for example an operator for a door, a gate, a window, blinds, shutters, a curtain, an awning or a light source including a controllable unit associated with the at least one device and a plurality of nodes for transmitting control signals to the at least one controllable unit. The at least one of the plurality of nodes for transmitting control signals is configured for transmitting a signal imposing a limit for at least one parameter for the device. Further, the controllable unit is configured for registering the limit and establishing a resulting limit for the parameter.

17 Claims, 3 Drawing Sheets

FOREIGN PATENT DOCUMENTS

| | | |
|---|---|---|
| EP | 1 069 695 | 1/2001 |
| EP | 1 158 840 | 11/2001 |
| JP | 03-221695 | 9/1991 |
| JP | 04-020197 | 1/1992 |
| JP | 2002231465 | 8/2002 |
| WO | WO 03/042480 A2 * | 5/2003 |

* cited by examiner

| Pool Entry | MP Min | MP Max |
|---|---|---|
| 1 | 20% | 60% |
| 2 | 32% | 72% |
| 3 | 10% | 42% |
| Resulting Range | 32% | 42% |

Fig. 2

| Pool Entry | MP Min | MP Max | Limitation Timer |
|---|---|---|---|
| 1 | 20% | 60% | 10 |
| 2 | 32% | 72% | 100 |
| 3 | 10% | 42% | 200 |
| Resulting Range | 32% | 42% | |

| Pool Entry | Master Address | MP Min | MP Max | STP1 Min | STP1 Max | SSTP1 Min | SSTP1 Max | Limitation Timer |
|---|---|---|---|---|---|---|---|---|
| 1 | W | 20% | 60% | 50% | 90% | 16000 | 80000 | n1 sec. |
| 2 | X | 32% | 72% | 0% | 100% | 8000 | 100000 | n2 sec. |
| 3 | Y | 10% | 42% | 0% | 75% | 0 | 70000 | n3 sec. |
| Resulting Range | | 32% | 42% | 50% | 75% | 16000 | 70000 | - |

Fig. 5

| Pool Entry | Master Address | Command Originator | MP Min | MP Max | STP1 Min | STP1 Max | SSTP1 Min | SSTP1 Max | Limitation Timer |
|---|---|---|---|---|---|---|---|---|---|
| 1 | W | CO1 | 20% | 60% | 50% | 90% | 16000 | 80000 | n1 sec. |
| 2 | X | CO2 | 32% | 72% | 0% | 100% | 8000 | 100000 | n2 sec. |
| 3 | Y | CO3 | 10% | 42% | 0% | 75% | 0 | 70000 | n3 sec. |
| Resulting Range | | | 32% | 42% | 50% | 75% | 16000 | 70000 | - |

SYSTEM AND METHOD FOR LIMITATION HANDLING

TECHNICAL FIELD OF THE INVENTION

The invention relates to a system and a method for controlling at least one device such as for example an operator for a door, a gate, a window, blinds, shutters, a curtain, an awning or a light source, said system comprising at least a controllable unit associated with said at least one device and a plurality of nodes for transmitting control signals to said at least one controllable unit.

BRIEF DISCUSSION OF RELATED ART

In control system wherein control points, sensors and actuators are included, such as for example home automation systems, a limitation in the operation of a controllable device may be imposed in certain conditions and in consequence of certain signals being transmitted from e.g. a sensor. For example, if a control signal from a rain sensor is received at a controllable node associated with a window, this may lead to a limitation at the controllable node, allowing the window to be opened only to a specified value, for example to 10% of the fully open position in order to prevent rainwater from entering the room. Thus, the window may be operated within a range of 0% to 10%.

However, situations may arise, where e.g. different sensors or controllers may transmit signals to the node, which each induces different limits for the controllable node and the device.

The prior art control systems have not been configured for handling such situations

BRIEF SUMMARY OF THE INVENTION

The invention provides a control system and a method of controlling such a system that provide improvements in relation to the prior art systems and which allows different limitation restrictions to be imposed on a controllable node, for example restrictions stemming from different sources.

Further, the invention provides such a control system and such a method of controlling such a system by means of which such limitations may be handled in a consistent and logic manner.

The invention also provides such a control system and such a method of controlling such a system by means of which it is made possible to improve the management capability of a control system, e.g. a home automation system, e.g. by providing a well functioning system that allows limitations to be handled in a smooth manner.

The invention relates to a system for controlling at least one device such as for example an operator for a door, a gate, a window, blinds, shutters, a curtain, an awning or a light source, said system comprising at least a controllable unit associated with said at least one device and a plurality of nodes for transmitting control signals to said at least one controllable unit. At least one of said plurality of nodes for transmitting control signals is configured for transmitting a signal imposing a limit for at least one parameter for the device, and that the controllable unit is configured for registering said limit and establishing a resulting limit for said parameter.

Hereby, it is achieved that the controllable unit will be able to handle such limitation signals sent from other nodes in the system in an organized manner. The controllable node will, when a new signal of such a type is received, register the limitation and perform an evaluation in view of e.g. previously registered limitation values, whereby a resulting range will result. Thus, when a command signal is received, the controllable node will handle such a command signal in view of the resulting operating range that has been established.

Preferably, said controllable unit may be configured for handling timer function means relating to said limit.

In this manner it is obtained that the respective entries may be set-up to be made time-dependable and excluded at a predetermined time, e.g. for example in view of a time information embedded in the received signal or in view of a time limit defined by e.g. the controllable node. Further, it is achieved that in case a node, which has transmitted a limitation setting signal, for some reasons may not be able to alter or delete the specific setting, for example because the node has no power source, e.g. caused by a flat battery, or has been removed so far from the system, that contact cannot be established, the specific limitation setting will not remain for an unspecified time in the system, but will eventually be removed automatically, when the timer lapses.

Advantageously, said at least one controllable unit may be configured for registering said limit by means of a limitation handling table.

Hereby, the limitation handling may be performed in a logic and efficient manner.

According to a further advantageous embodiment, said limitation handling table may comprise an evaluation row for specifying a resulting range for operation of the device as regards said at least one parameter. Hereby it is obtained that an evaluation result is readily presented and that when the controllable node receives a control signal requiring an actuation, a relatively simple comparison with the evaluation result in the evaluation row need only be performed in order to determine, what action has to be taken.

Advantageously, said limitation handling table may comprise means for handling limits relating to a plurality of parameters.

Hereby, it is achieved that the system will be able to handle a relatively sophisticated control system in a logic and relatively easy manner.

Preferably, said limitation handling table may comprise means for handling limits relating to a lower limit and/or an upper limit for said at least one parameter.

Hereby, the table may be organized in an advantageous manner, whereby the minimum values and/or the maximum values are registered as independent values in an entry row. It is noted, though, that instead of minimum values and the maximum values for certain signals and/or sensors, controllers etc. it may be arranged that if a incoming signal specifies a min-value below a predefined level, the min-value may be set to be e.g. 0%, and if the incoming signal specifies a max-value above a predefined level, the max-value may be set to be e.g. 100%. Other manners of specifying the entries in the table in view of the signal that is received are possible.

According to a still further advantageous embodiment, said at least one controllable unit may be configured for performing said evaluation in accordance with a predefined algorithm and specifying the result in said evaluation row of said limitation handling table.

Apparently, many algorithms may be implemented according to the invention, thus giving a flexible system. Preferably, the resulting lower limit may be defined as the highest of the Min-values, and the resulting upper limit may be defined as the lowest of the Max-values.

Advantageously, said at least one controllable unit may comprise means for storing and handling command originator information, said command originator information comprising an identification of a predetermined type of the node from which a limiting signal originates.

Hereby, it is achieved that the node, from which a command signal has been sent, e.g. a remote control operated by the user, may be informed of the cause of the non-execution of the actuation or the non-complete actuation, e.g. the user may receive a message or an icon on the display of the remote control informing the user that the window has been opened only to 10% because it is raining. Thus, the user will not be confused by what might otherwise have been interpreted as a faulty or malfunctioning control system.

The invention also relates to a method of controlling at least one device such as for example an operator for a door, a gate, a window, blinds, shutters, a curtain, an awning or a light source, said system comprising at least a controllable unit associated with said at least one device and a plurality of nodes for transmitting control signals to said at least one controllable unit. At least one of said plurality of nodes for transmitting control signals transmits a signal imposing a limit for at least one parameter for the device, and that the controllable unit registers said limit and establishes a resulting limit for said parameter.

Hereby, it is achieved that the controllable unit will be able to handle such limitation signals sent from other nodes in the system in an organized manner. The controllable node will, when a new signal of such a type is received, register the limitation and perform an evaluation in view of e.g. previously registered limitation values, whereby a resulting range will result. Thus, when a command signal is received, the controllable node will handle such a command signal in view of the resulting operating range that has been established.

Preferably, said controllable unit may be configured for handling timer function means relating to said limit.

In this manner it is obtained that the respective entries may be set-up to be made time-dependable and excluded at a predetermined time, e.g. for example in view of a time information embedded in the received signal or in view of a time limit defined by e.g. the controllable node. Further, it is achieved that in case a node, which has transmitted a limitation setting signal, for some reasons may not be able to alter or delete the specific setting, for example because the node has no power source, e.g. caused by a flat battery, or has been removed so far from the system, that contact cannot be established, the specific limitation setting will not remain for an unspecified time in the system, but will eventually be removed automatically, when the timer lapses.

According to an advantageous embodiment, said at least one controllable unit may register said limit by means of a limitation handling table.

Hereby, the limitation handling may be performed in a logic and efficient manner.

Advantageously, said limitation handling table may comprise an evaluation row for specifying a resulting range for operation of the device as regards said at least one parameter.

Hereby it is obtained that an evaluation result is readily presented and that when the controllable node receives a control signal requiring an actuation, a relatively simple comparison with the evaluation result in the evaluation row need only be performed in order to determine, what action has to be taken.

According to a further advantageous embodiment, said limitation handling table may comprise means for handling limits relating to a plurality of parameters.

Hereby, it is achieved that the system will be able to handle a relatively sophisticated control system in a logic and relatively easy manner.

Advantageously, said limitation handling table may comprise means for handling limits relating to a lower limit (Min) and/or an upper limit (Max) for said at least one parameter.

Hereby, the table may be organized in an advantageous manner, whereby the minimum values and/or the maximum values are registered as independent values in an entry row. It is noted, though, that instead of minimum values and the maximum values for certain signals and/or sensors, controllers etc. it may be arranged that if a incoming signal specifies a min-value below a predefined level, the min-value may be set to be e.g. 0%, and if the incoming signal specifies a max-value above a predefined level, the max-value may be set to be e.g. 100%. Other manners of specifying the entries in the table in view of the signal that is received are possible.

Preferably, said at least one controllable unit may perform said evaluation in accordance with a predefined algorithm and specify the result in said evaluation row of said limitation handling table.

Apparently, many algorithms may be implemented according to the invention, thus giving a flexible system. Preferably, the resulting lower limit may be defined as the highest of the Min-values, and the resulting upper limit may be defined as the lowest of the Max-values.

According to a further advantageous embodiment, said at least one controllable unit may store and handle command originator information, said command originator information comprising an identification of a predetermined type of the node, from which a limiting signal originates.

Hereby, it is achieved that the node, from which a command signal has been sent, e.g. a remote control operated by the user, may be informed of the cause of the non-execution of the actuation or the non-complete actuation, e.g. the user may receive a message or an icon on the display of the remote control informing the user that the window has been opened only to 10% because it is raining. Thus, the user will not be confused by what might otherwise have been interpreted as a faulty or malfunctioning control system.

According to a still further advantageous embodiment, said stored limitation information may be rejected at the lapse of a time period.

Hereby it is achieved that limitations that may be made time-dependable, are excluded from the table, for example when the table is re-evaluated either when a new signal has been received or when a regularly performed re-evaluation is performed.

BRIEF DESCRIPTION OF THE FIGURES

The invention will be explained in further detail below with reference to the figures of which FIG. 2 shows an example of a limitation management table in accordance with an embodiment of the invention, and FIGS. 3-5 show further examples of a limitation management table in accordance with further aspects of the invention.

DETAILED DESCRIPTION OF THE INVENTION

Figure 1:
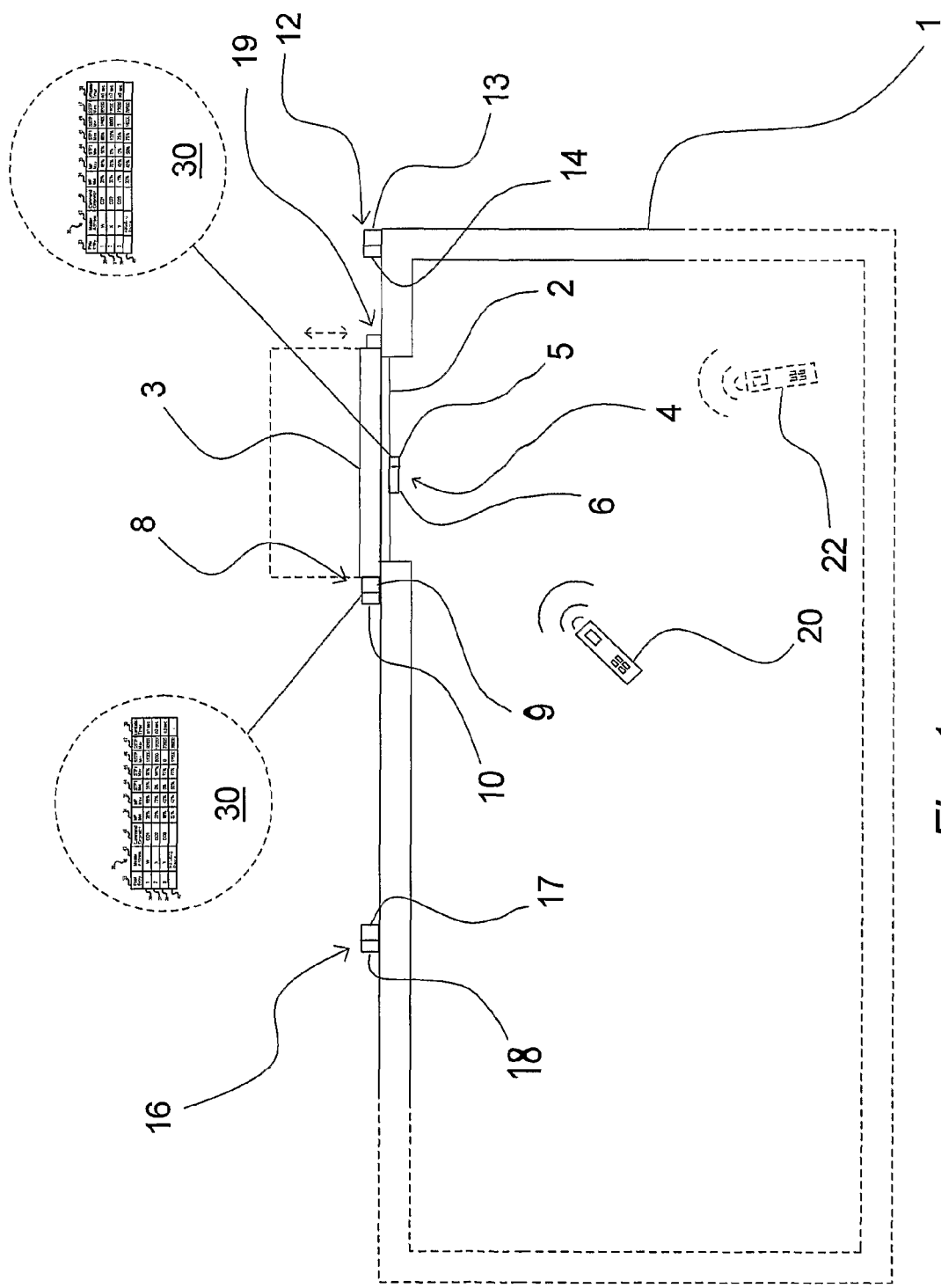
FIG. 1 shows in a schematic manner an example of a control system in accordance with the invention.

An example of a control system according to an embodiment of the invention, e.g. a home automation system or part thereof, is illustrated in FIG. 1. Here, a building, a house or the like 1 is illustrated in a schematic manner, showing in detail only a part of the house or a room where a window 2 is located. The window 2 may be provided with a window actuator, operator or opener 4, which may comprise a drive mechanism generally designated 6 and a controllable node 5, e.g. a node comprising a radiofrequency receiver and control means. Further, the window 2 may be provided with an awning 3, which is retractable as indicated, operated by means of an operator 8. This operator 8 may comprise a drive engine generally designated 9 and a controllable node 10, e.g. a node comprising a radiofrequency receiver and control means.

The control system may also comprise one or more sensors such as e.g. a wind speed sensor 12, a sunlight sensor 16 and a rain sensor 19. Such sensors may as indicated comprise a sensor part, e.g. an anemometer 13 and a photometer 17, respectively, and a transmitter part, e.g. 14 and 18, respectively, which transmitter parts may e.g. comprise RF-means or may rely on wired transmission. The rain sensor 19 may be integrated with the window 2, but will also comprise a sensor part and a transmitter part (not illustrated). Further sensors or controllers may be provided, also inside the room, for example in the form of a temperature sensor etc.

Further, the control system may comprise one or more remote controls 20 and 22 as shown for operating the controllable devices, e.g. the window opener 4 and the awning 3. These remote controls may be similar, e.g. comprise similar properties, but they may also differ, e.g. have different properties as regards e.g. priority. One, e.g. the remote control 20 may for example be a master control while another, e.g. the remote control 22 may be a slave remote control.

These remote controls 20 and 22 and the sensors 12, 16 and 19 may all transmit control signals to the controllable units, e.g. the controllable nodes 5 and 10, associated with the window 2 and the awning 3, respectively. It will be understood that the terms "control signals" in this respect comprise any signal transmitted from a node such as a sensor or a remote control to a controllable unit, including signals representing measured values etc., and that the controllable unit may or may not react upon such a signal, e.g. in accordance with certain predefined or established rules.

For example, a signal transmitted from the wind sensor 12 to the controllable unit 10 associated with the awning 3 can serve to limit the scope of movement of the awning, e.g. prescribe that the awning, which may for example be 200 cm long, may not be rolled out more than 50 cm in the specific wind speeds. Thus, the awning is limited to operation within a range of 0% to 25%.

If, at the specific time where the limitation is prescribed, e.g. when the signal from the wind speed sensor 12 is received at the controllable node 10, the awning is rolled out with 40 cm, it is within the limits and will not be actuated. However, a user trying to actuate the awning to e.g. fully unrolled position will only achieve the result that the awning is moved to a 25% position. If at a later time the wind speed rises, the wind speed sensor may transmit a signal to the controllable node that in accordance with the rules that are assigned to the awning will require a limit of 0% to 15% to be imposed. Since 15% corresponds to 30 cm, the awning will now be actuated and moved to the upper limit position, i.e. 15%.

However, in a system as described, a controllable node may receive control signals from two or more controllers or sensors that each will infer a limitation on the operation of the controllable node and the associated device. For example, the rain sensor may have transmitted a signal indicating rainfall which may—according to the rules of the window opener 4—establish a limit of for example 0% to 20% opening of the window. Further, another sensor may have transmitted a signal that indicates to the controllable node that a limit of for example 10% to 50% opening of the window must be established. In order to handle such situations, the limitations are evaluated by means of a limitation handling table 30 as shown in FIG. 1. Each of the controllable nodes, e.g. 5 and 10 may be provided with such a limitation handling table.

An example of such a management table is shown in FIG. 2. The table comprises a pool entry column 33, wherein the number, e.g. 1, 2, 3 etc. relating to an entry 36, 37, 38 is specified. Further, two columns 34 and 35 are arranged for a single parameter MP, i.e. a column 34 for a lower limitation value (Min) and a column 35 for an upper limitation value (Max).

As shown, the table may comprise three entries 36, 37, 38, each one setting limitations on the parameter MP. Further, the table comprises an evaluation row 40, wherein the result of an evaluation performed by the controllable node for the lower and upper limits of the entries is specified. Such an evaluation may be performed in accordance with various algorithms and rules that may be assigned to the specific controllable nodes, for example in dependence on the type of the controllable node and/or the device associated with the node. In the illustrated example, the resulting lower limit is defined as the highest of the Min-values and the resulting upper limit is defined as the lowest of the Max-values.

As shown in FIG. 3, the management table 32 may also comprise means for handling a timer function, e.g. indicated with the limitation timer row 36. When an incoming signal is received, giving rise to an entry in the limitation handling table, it may contain information as to the period for which the limitation must be observed, e.g. a number of minutes. For example, a signal from a rain sensor indication rainfall may specify that the limitation is valid for e.g. 20 minutes after receipt of the signal. Thus, a limitation timer entry specifying 20 minutes is set up.

Further, it will be understood that when a signal is received at the controllable node, requiring an actuation to be performed, a comparison with the limitation handling table 30 is performed in order to examine whether or not the actuation may be performed. In this respect, it is noted that the table 30 may be updated and re-evaluated when such a signal is received, before it is examined whether or not the requested actuation can be performed. This updating will include the deletion of entries for which the timer has run out and a subsequent re-evaluation in order to achieve an updated evaluation row, i.e. an updated resulting range.

The updating of the handling table 30 will also be performed when an incoming signal is received, requiring not necessarily an actuation but at least a limitation entry. In this respect it is noted that an incoming signal may contain information only regarding a requested actuation, only a limitation or a combination of both.

Further, the up-dating of the handling table 30 may also be performed on a regular basis, but preferably at least when an incoming signal is received.

As shown in FIG. 4, the limitation handling table 30 may handle limitations relating to more than one parameter, for example in addition to the parameter MP the parameters STP1 and SSTP1, for which columns for Min-values, 44 and 46, respectively, and Max-values, 45 and 47, respectively are arranged. As shown, for each of the entries 37, 38 and 39, limitation values are specified, although it will be understood that the corresponding received signals did not necessarily contain information relating to the specific values. For example, the entry 37 specify a range of 0% to 100% for the parameter STP1, meaning that no limitation had been specified for this parameter. Similarly, the entry 38 specify a Min-value of 0% for the parameter SSTP1, meaning that no lower limitation had been specified for this parameter. It will be understood that when the handling table comprises a plurality of parameters, the evaluation algorithm may be the same for the parameters or different algorithms may be utilized. In the example shown in FIG. 4, the abovementioned rule specifying the resulting lower limit to be defined as the highest of the Min-values and the resulting upper limit to be defined as the lowest of the Max-values is used for all parameters.

Further, it is shown in FIG. 4 that the table 30 may also comprise information 42 regarding the master address from which the specific signal was sent, i.e. the specific sensor or controller node.

A further embodiment of the invention is shown in FIG. 5, wherein also information regarding a command originator 48, i.e. the information regarding the type of equipment, from which a control signal has been sent, may be specified. For example, the command originator CO1 may be a rain sensor, the command originator CO2 may be a wind speed sensor and the command originator CO3 may be a master remote control. When a command signal is received that cannot be executed or at least not be executed fully, an acknowledgement signal may be sent to the node that has sent the command signal specifying that e.g. the actuation has not been performed or that the actuation has only been performed to e.g. 45%. Further, when the command originator is specified in the table, the node may also receive information as to the cause of the non-execution or the incomplete execution.

For example, if the user with his/her remote control tries to open a window fully, i.e. 100%, and the maximum operation of the specific window is limited by a wind sensor setting a resulting Max.-limitation of 42%, e.g. the parameter MP Max in FIG. 5, then the user will be informed via the display on the remote control that the window can only be opened to 42% due to a wind sensor, i.e. because the wind is blowing heavily. Thus, the user will not be puzzled by the actual operation of the window not being in correspondence with the control signal that has been sent from the remote control, but he/she will understand the reason.

It will be understood that the table 30 for practical reasons will be limited as regards the number of entries. If a control signal is received that has a content requiring an entry to be made when the table is full, different solutions are possible. The simplest solution is to reject the control signal. However, other manners of handling such a situation are possible. For example, it may be decided that the entry with the smallest remaining timer value may be excluded etc.

The content of the limitation management table 30 may be read, for example in case of status requests, service checks, etc. in which case the individual entries may be read, but most importantly, the content of the evaluation row 40.

It will be understood that a limitation handling system in accordance with the invention may be combined with other handing systems and methods used in control systems, e.g. home automation systems, for example a priority and level management handling system etc.

It will be understood that the invention is not limited to the particular examples described above and illustrated in the drawings but may be modified in numerous manners and used in a variety of applications within the scope of the invention as specified in the claims.

The invention claimed is:

1. System for controlling at least one device, said system comprising
   at least a controllable unit associated with said at least one device and
   a plurality of nodes for transmitting control signals to said at least one controllable unit
   wherein at least one of said plurality of nodes for transmitting control signals is configured for transmitting a signal imposing a limit for at least one parameter for the device, and
   wherein the controllable unit is configured for utilizing a limitation handling table for registering said limit and establishing a resulting limit for said parameter.

2. System according to claim 1, wherein said controllable unit is configured for handling a timer function relating to said limit.

3. System according to claim 1, wherein said limitation handling table comprises an evaluation row for specifying a resulting range for operation of the device as regards said at least one parameter.

4. System according to claim 3, wherein said at least one controllable unit is configured for performing said evaluation in accordance with a predefined algorithm and specifying the result in said evaluation row of said limitation handling table.

5. System according to claim 1, wherein said limitation handling table comprises one or more arrangements for handling limits relating to a plurality of parameters.

6. System according to claim 1, wherein said limitation handling table comprises one or more arrangements for handling limits relating to a lower limit and/or an upper limit for said at least one parameter.

7. System according to one or more of claim 1, wherein said at least one controllable unit comprises an arrangement for storing and handling command originator information, said command originator information comprising an identification of a predetermined type of the node, from which a limiting signal originates.

8. A system according to claim 1, wherein said device is an operator for a door, a gate, a window, blinds, shutters, a curtain, an awning or a light source.

9. Method of controlling at least one device, said system comprising at least a controllable unit associated with said at least one device and a plurality of nodes for transmitting control signals to said at least one controllable unit, said method comprising:
   at least one of said plurality of nodes for transmitting control signals transmits a signal imposing a limit for at least one parameter for the device, and
   the controllable unit utilizes a limitation handling table for registering said limit and establishes a resulting limit for said parameter.

10. Method according to claim 9, wherein said controllable unit is configured for handling a timer function arrangement relating to said limit.

11. Method according to claim 9, wherein said limitation handling table comprises an evaluation row for specifying a resulting range for operation of the device as regards said at least one parameter.

12. Method according to claim 11, wherein said at least one controllable unit performs said evaluation in accordance with a predefined algorithm and specifies the result in said evaluation row of said limitation handling table.

13. Method according to claim 9, wherein said limitation handling table comprises one or more arrangements for handling limits relating to a plurality of parameters.

14. Method according to claim 9, wherein said limitation handling table comprises one or more arrangements for handling limits relating to a lower limit and/or an upper limit for said at least one parameter.

15. Method according to claim 9, wherein said at least one controllable unit stores and handles command originator information, said command originator information comprising an identification of a predetermined type of the node, from which a limiting signal originates.

16. Method according to claim 9, whereby said stored limitation information is rejected at the lapse of a time period.

17. Method according to claim 9, wherein said device is an operator for a door, a gate, a window, blinds, shutters, a curtain, an awning or a light source.

* * * * *